May 30, 1972 L. DICKY 3,666,330
THRUST BEARING ARRANGEMENT FOR TURBO-DRILLS
Filed Oct. 20, 1970
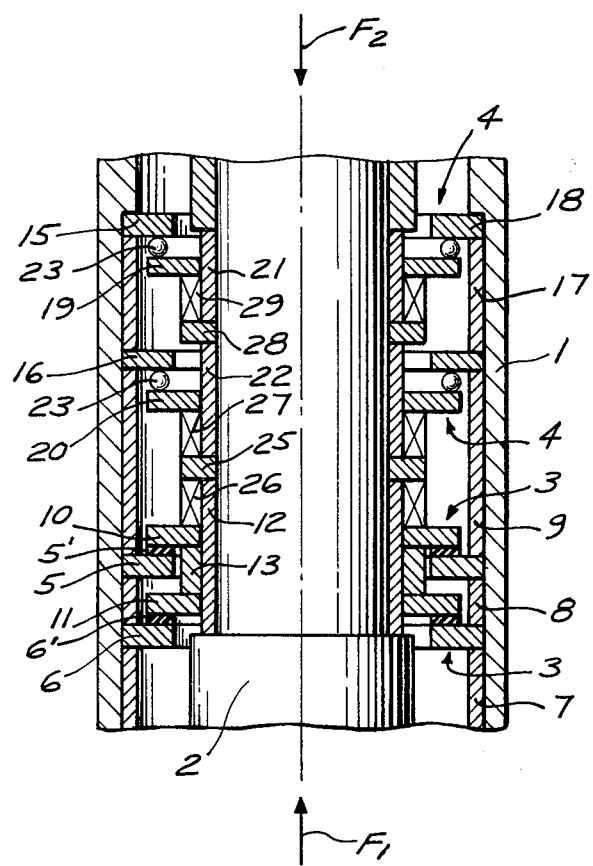
INVENTOR.
LEONIDE DICKY
BY
ATTORNEY

United States Patent Office 3,666,330
Patented May 30, 1972

3,666,330
THRUST BEARING ARRANGEMENT FOR TURBO-DRILLS
Leonide Dicky, Grenoble, France, assignor to Societe Generale de Construction Electriques et Mecaniques (ALSTHOM), Grenoble, France
Filed Oct. 20, 1970, Ser. No. 82,437
Int. Cl. F16c *21/00, 17/04, 19/10*
U.S. Cl. 308—35                                6 Claims

ABSTRACT OF THE DISCLOSURE

The disclosed layout of thrust bearing for a turbo-drill includes a single acting sliding thrust bearing arranged to transmit only those axial loads on the drive shaft which are directed toward the drilling bit, and a single acting roller thrust bearing capable of working in the mud flush and arranged to transmit only those axial loads on the drive shaft which are directed away from the drilling bit. This selective transmission of the axial loads is accomplished by the use of longitudinal absorbers between the drive shaft and the sliding and roller thrust bearings.

---

This invention relates to underground machines used for drilling boreholes, such as turbo-drills fitted with hydraulic turbines, and more particularly to the thrust bearings employed in such machines for transmitting axial load between the shaft and the machine casing.

In the use of turbo-drills there are exerted on the bit considerable axial loads, the reactions of which are transmitted from the shaft to the casing of the machine through the thrust bearings and which because of their complexity and degree under operating conditions create problems in the construction of such thrust bearings. When a turbo-drill, fitted with a hydraulic turbine is operating, the pressure loss of the driving fluid for the hydraulic turbine, which is the drilling liquid injected into the well, and known as "mud flush," produces an axial thrust on the shaft of the machine which is transmitted to the drilling bit connected to the shaft. The reaction to the axial thrust arising from pressure loss is borne directly by the distributor blades housed in the casing of the machine, without transmission through the thrust bearings, if the axial thrust of the hydraulic motor is equalled by the ground axial reaction on the bit. However, if the ground reaction is greater than the motor thrust, then the shaft will exert an axial load on the thrust bearing which is equal to the difference between such forces and in a direction away from the bit. This is known as working in "mechanical thrust." On the other hand, when the ground reaction is less than the motor thrust then the shaft acts on the thrust bearings towards the bit and the thrust bearings operate, according to the terminology of the art, in "hydraulic thrust."

Further, the rotation torque necessary for the drilling bit increases with the axial load that is exerted on the ground by the bit. in the case of a turbo-drill fitted with a hydraulic turbine, the speed of rotation will decrease as the torque required for the bit increases. Thus, when both the end load exerted by the bit on the ground and the torque required for the bit are high, while the rotation speed of the bit is low, the thrust bearings will work in "mechanical thrust" i.e. the axial load on the thrust bearings will act in a direction away from the bit. The thrust bearings will work in "hydraulic thrust" when both the axial load exerted on the ground and the driving torque required for the bit are nil or low while the rotation speed is high. When a turbo-drill rotates at low speed it provides a driving torque approaching its maximum, but its operation is liable to become unstable. Thus, the drill may stall if the oscillations of the axial feedback from the ground and, consequently, the torque required by the bit, necessitate a driving torque which exceeds the maximum available. This is a serious drawback in the use of known turbo-drills and presents a material problem since the optimum operating conditions for certain drilling bits, such as rock bits, are at low rotation speeds.

The thrust bearings that are normally used on underground drilling motors are either sliding friction bearings, or roller thrust bearings. Sliding friction thrust bearings include rings that are mounted alternately on the shaft and on the casing of the motor and transmit axial force between their faces by frictional contact. As presently made, the rings mounted on one of the machine parts, e.g. the shafts, have frictional surfaces composed of strengthened surface metal, e.g. case hardened steel, while those rings mounted on the other machine part, e.g. the motor casing, have friction surfaces constituted of an elastomer coating. The drawback of such sliding friction thrust bearings is that their high level of friction torque must be deducted from the drive torque with a consequent decrease in the real drive torque at the bit. It has been found by borehole drilling tests that this unwanted torque due to friction in the sliding thrust bearings is the main cause of operational instability and of stalling at low rotation speeds.

Roller thrust bearings are each composed of moving units, such as balls or rollers, rolling between two rings, one of which is mounted on the shaft and the other of which is housed in the body of the machine. In practice the main components of a roller thrust bearing are made of metal such as high resistant alloy steel. In the use of roller thrust bearings, their drive losses are very low and they can be used at low rotation speeds without the danger of instability effects. But when compared to sliding thrust bearings, roller thrust bearings have the disadvantage that their working life in mud flush is much shorter, especially at high speeds of rotation.

The principal purpose of the instant invention is to provide an improved thrust bearing arrangement or layout that does not have the aforesaid disadvantages of the conventional thrust bearing arrangements heretofore employed in turbo-drill machines.

In accordance with the invention this purpose is essentially realized by including in the layout at least one simple sliding thrust bearing so that it transmits only the axial loads on the drive shaft directed toward the drilling bit, and at least one simple roller bearing capable of working in the mud flush and transmitting only those loads on the drive shaft which are directed away from the bit. Preferably one part of each of the thrust bearing units is housed in the body of the turbine and the other part thereof is connected to the turbine shaft through a longitudinal shock absorber. In such an arrangement the sliding thrust bearing will absorb the whole of the axial force of the drive shaft while the turbine works in "hydraulic thrust" i.e. at high speed and with low torque, under which conditions the risk of instability and stalling is eliminated and the roller bearings are freed from the considerable wear they would undergo at such high rotational speed. On the other hand, when the turbine works in "mechanical thrust" i.e. at high torque and low speed, the roller bearings will absorb the whole of the axial force on the drive shaft. Under such conditions, the low torque losses through the roller thrust bearings will not affect the stability and operation of the turbine in spite of the low rotating speed, and the wear on such roller thrust bearings will be low due to the slow speed of rotation.

For a better understanding of the invention, as well as the advantages and features of novelty thereof, reference is made to the accompanying drawing which shows by way of example a cross-section of a thrust bearing layout for a turbo-drill that is constructed in accordance with the invention, and to the following description of such layout.

In the drawings, the body or casing of the hydraulic turbine for the turbo-drill is designated 1 and the turbine drive shaft is designated 2. As is conventional, the driving part of the turbine (not shown) is connected to the upper part of shaft 2 and the drilling bit (not shown) is connected to the lower end of such shaft. The thrust bearing layout shown is composed of two sliding thrust bearings generally designated 3, 3 and the two roller thrust bearings generally designated 4, 4.

The two sliding thrust bearings 3, 3 are composed of outer rings 5, 6 fixed in spaced relation to the body 1 of the turbine by braces 7, 8 and 9 and provided on their friction surfaces with rubber coatings 5', 6', respectively. The rubber coatings 5', 6' are in engagement with the case hardened surfaces of the spaced inner steel thrust rings 10 and 11, respectively, which are mounted for free sliding movement on a wear ring 12 provided on the shaft 2. The rings 10 and 11 are connected in spaced relation by a brace 13 which is also free to slide axially along shaft 2.

The two roller thrust bearings 4, 4 are composed of outer rings 15, 16 fixed in spaced relation on the body 1 of the turbine by the braces 9 and 17 and an annular shoulder 18 formed interiorly of such body 1. The rings 15, 16 are associated with inner rings 19 and 20, respectively, mounted for free slidable axial movement on wear rings 21 and 22, respectively, mounted on shaft 2. Balls of rollers 23 are provided between the rings 15, 19 and between the rings 16, 20.

Mounted on the shaft 2 between the inner sliding thrust bearing 5, 10 and the inner roller thrust bearing 16, 20 and secured between the wear rings 12 and 22 is a plate 25 which is connected to the inner rings 10 and 20 of such bearings by two tensile shock absorbing rings 26 and 27. A further plate 28 is mounted on shaft 2 between the wear rings 22 and 21 and is connected to the inner ring 19 of the outer roller thrust bearing 15, 19 by means of a tensile rubber shock absorber 29.

It will be observed that as a result of the above described arrangement, when the shaft 2 is running at low speed with high torque and the end loads thereon drive axial forces from the bit in the direction of the arrow F1, such axial forces are transmitted through the plates 25 and 28 to the inner roller thrust bearing rings 20 and 19, respectively, through the shock absorbers 27 and 29, respectively, which will be in compression as a result of such forces. Since such axial forces acting on the plate 25 will be directed in a direction opposite to that of the inner plates or rings 10 and 11 of the slide bearings 3, 3, such plates will work in released condition with no force being transmitted thereto through the shock absorber 26. When, however, the shaft 2 is running at high speed and low torque so that the axial load thereon is driven from the driving component of the turbine in the direction indicated by the arrow F2, such force will be transmitted through plate 25 and through the shock absorber 26 working under compression to ring 10 of the inner slide bearing 3, and through ring 10 and brace 13 to inner ring 11 of the outer slide bearing 3. Under such conditions, no force will be transmitted through the shock absorbers 27, 29 to the roller thrust bearings 4, 4 so that they will operate in a released manner. It will thus be seen that the ball thrust bearings 4, 4 of the device will work only in "mechanical thrust" when the end load exerted by the bit on ground, as well as the torque required for the bit, are high, and its rotating speed is low. The sliding thrust bearings 3, 3, however, only work in "hydraulic thrust" when the axial load exerted in the ground, as well as the required driving torque for the bit, are low, and the rotating speed is high.

What is claimed is:

1. In a turbo-drill, having a shaft to which the drilling bit is connected and fitted with a hydraulic turbine for driving said shaft a thrust bearing layout composed of a sliding thrust bearing, a roller thrust bearing spaced from said sliding thrust bearing, and means between said roller thrust bearing and said sliding thrust bearing for transmitting from the shaft to said sliding thrust bearing only differential axial loads predominately from the turbine, and to said roller thrust bearing only differential axial loads predominately from the driving bit.

2. In a turbo-drill as defined in claim 1, in which said sliding and roller thrust bearings each include a part fixed to the body of the machine and a cooperating part mounted for axial movement on the shaft, and in which said transmitting means include means fixed to the shaft, and elastic absorbing means between said fixed means and said cooperating part and compressible by said fixed means to direct the differential axial loads to alternative cooperating parts.

3. In a turbo-drill as defined in claim 2, in which said fixed means is constituted of a plate located between said cooperating parts, and said elastic absorbing means includes a first longitudinal absorber between said plate and one of said cooperating parts, and a second longitudinal absorber between said plate and the other cooperating part.

4. In a turbo-drill as defined in claim 2, including a second sliding thrust bearing and a second roller thrust bearing each including a part fixed to the body of the machine and a cooperating part mounted for axial movement on the shaft, and in which said fixed means is composed of two plates fixed in spaced relation to the shaft, and said elastic absorbing means comprises a plurality of longitudinal absorbers between said two plates and said cooperating parts.

5. In a turbo-drill as defined in claim 4, in which one of said plates is located between two of said four cooperating parts and is connected to the latter by two longitudinal absorbers, in which one of such two cooperating parts is connected to a third cooperating part by a brace member, and in which the fourth cooperating part is connected to the other of said plates by a third longitudinal absorber.

6. In a turbo-drill as defined in claim 4, in which said sliding thrust bearings are single acting bearings and arranged in paired relation, in which said roller thrust bearings are single acting bearings capable of working in mud flush and are arranged in paired relation, and in which one of said plates is located between said pairs of bearings and the other of said plates is located between the bearings of a pair thereof.

References Cited

UNITED STATES PATENTS 3,449,030    6/1969    Tiraspolsky et al. ____ 308—200

MARTIN P. SCHWADRON, Primary Examiner

F. S. SUSKO, Assistant Examiner

U.S. Cl. X.R.

308—135, 230